United States Patent [19]

Makus

[11] Patent Number: 4,625,596
[45] Date of Patent: Dec. 2, 1986

[54] ELECTRICAL PLIERS

[76] Inventor: Adolph Makus, 5004 State Rd. 92, Lake Stevens, Wash. 98258

[21] Appl. No.: 663,687

[22] Filed: Oct. 19, 1984

[51] Int. Cl.$^4$ ............................................. H02G 1/12
[52] U.S. Cl. ................................... 81/9.44; 30/90.1; 30/91.2; 7/107
[58] Field of Search ................. 30/90.1, 91.2; 81/9.5, 81/9.5 A; 7/132, 107

[56]  References Cited
U.S. PATENT DOCUMENTS

| | | | |
|---|---|---|---|
| 924,357 | 6/1909 | Irwin . | |
| 3,613,235 | 10/1971 | McCormick | 81/9.5 R X |
| 3,854,202 | 12/1974 | Cortese et al. | 30/91.2 |
| 3,871,078 | 3/1975 | Ogle | 30/90.1 |
| 3,872,746 | 3/1975 | Wittes et al. | 81/9.5 R |
| 3,913,425 | 10/1975 | Iff | 81/9.5 A |
| 3,928,878 | 12/1975 | Van Heuman | 30/90.1 X |
| 4,047,297 | 9/1977 | Hanson | 30/90.1 |
| 4,225,990 | 10/1980 | Theiler, Sr. | 30/90.1 X |

Primary Examiner—E. R. Kazenske
Assistant Examiner—Willmon Fridie, Jr.
Attorney, Agent, or Firm—Garrison & Stratton

[57] ABSTRACT

The present invention is a tool which will simultaneously cut an electrical wire and strip the predetermined length of insulation from the conductor. It comprises a pair of pivotally connected planar arm members in which the portion of the arms on one side of the pivot serve as operating handles. That part of the arms on the other side of the pivot has a pair of upturned, transversely operating wire-severing jaws which are oriented substantially normal to the longitudinal axis of the tool and normal to the plane of the arm. Anterior to these jaws is a pair of upturned insulation stripping members which are oriented parallel to the cutting portions of the severing jaws. These have cooperating opposed notches for cutting through the wire insulation. An adjustable stop mounted on the handle portion controls the depth of cut. In use, it is only necessary to place the end of a wire in the tool, squeeze the handles, and give a slight twist and axial pull to remove the insulation. A consistant length of insulation is removed from the end of the wire at each use of the tool.

6 Claims, 6 Drawing Figures

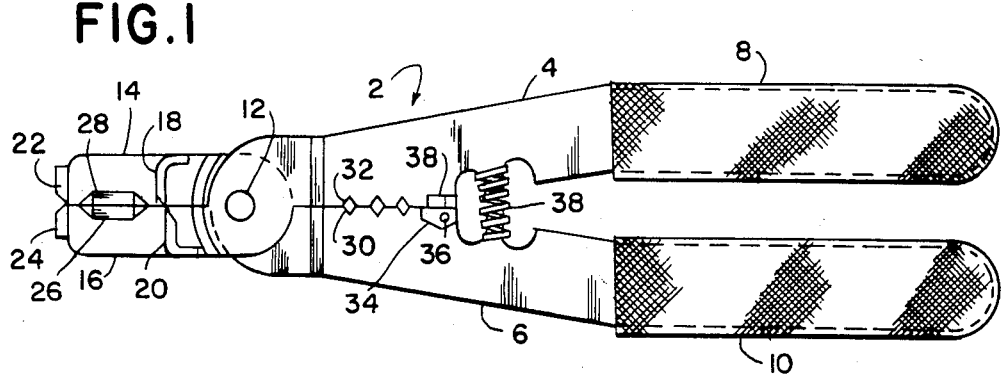
FIG.1
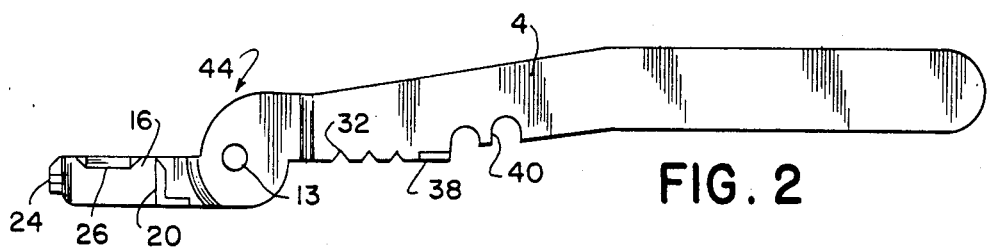
FIG. 2
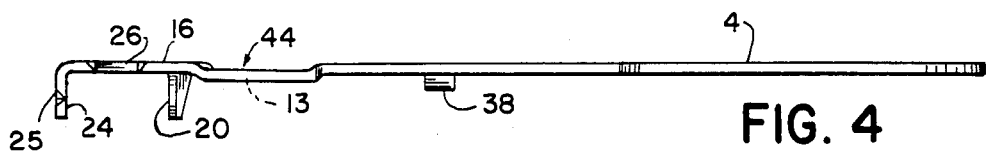
FIG. 4
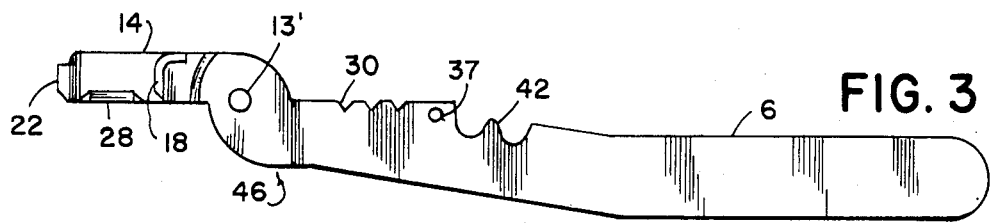
FIG. 3
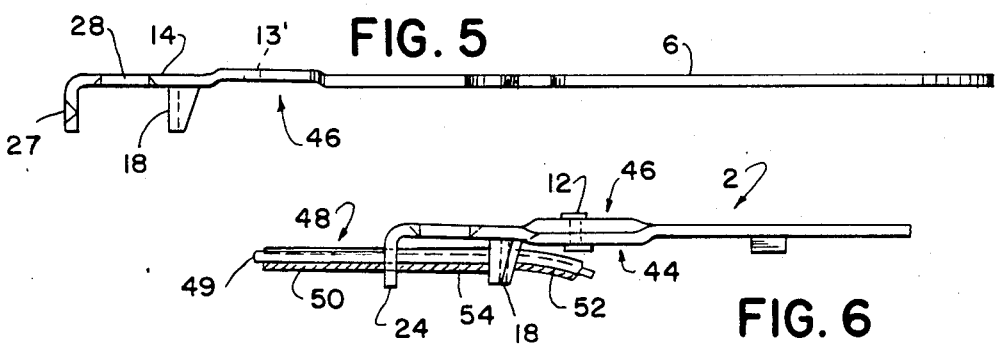
FIG. 5
FIG. 6

ELECTRICAL PLIERS

BACKGROUND OF THE INVENTION

The present invention relates to an improved type of electrician's pliers which will simultaneously cut and strip a predetermined length of insulation from a wire.

Specialty pliers which will separately cut wire and strip a length of insulation from the electrical conductor are in common use by electricians. The insulation stripping operation is necessary to expose the conductor when connecting the wire to an appliance or when two or more wires are to be connected. Available pliers range from very simple to relatively complex in construction and function. Most are adapted to operate on a number of different wire sizes. Additionally, some also serve to crimp connectors such as spade lugs to the end of a wire. Formerly, in connecting a wire to a unit the electrician had to make a loop in the conductor end. This is held to the appliance under a screw head. In recent years, switches and wall plugs for home and commercial use have become available, in which it is only necessary to insert a short length of bare conductor into a small opening in the device. There it is held tightly by a pair of miniature jaws. Devices of this type have had a significant impact in reducing the amount of time required for home and commercial wiring.

One requirement common to switches, wall plugs, and other devices of the above type is that the wire must be stripped for a predetermined length. The electrician usually gages this length by eye so that it is rarely precise. If the length of conductor stripped is too short, there is risk that it will not be held tightly in the appliance and may work loose, causing an open circuit. If too great a length of insulation is stripped, bare conductor will be exposed at the connection and this presents a potential hazard of shocks or short circuits. For these reasons, it would be a major advantage to an electrician to have pliers available that would cut wire and strip a precise predetermined length of insulation simultaneously. To the present inventors knowledge, no such pliers are commercially available.

Cortese, in U.S. Pat. No. 3,854,202, shows a pair of electrical pliers forged with cutting jaws similar to those found on end nippers. Each jaw has attached to it by a wing nut, an adjustable insulation cutter, which serves as a stripper. A thumb screw serves as a stop to control jaw closure so that various wire sizes can be stripped without cutting into the conductor. Iff, in U.S. Pat. No. 3,913,425, shows a very complex cutter/stripper. This first severs the end of the wire then cuts into the insulation. An auxiliary pair of jaws then grips and strips the insulation as the handles are squeezed to a full closed position. A simpler and more nearly conventional type of stripper is shown in U.S. Pat. No. 3,872,746, to Wittes et al. This has a pair of conventional longitudinal cutting jaws bearing transverse end-mounted stripper jaws. The stripping operation is adjusted for wire size by a slideable cam mounted on one of the handles. Irwin, U.S. Pat. No. 924,357, shows an early style of lineman's pliers.

Each of the aforementioned types of pliers have certain shortcomings. Those that cut and strip in one operation are unnecessarily complex and expensive, and, in some cases, would be very difficult to adjust precisely. The present invention overcomes the above problems so that the electrician can readily cut and precisely strip a predetermined length of insulation from the end of wire in one rapid operation.

SUMMARY OF THE INVENTION

The present invention is a plier-like tool for simultaneously cutting an electrical wire and stripping a predetermined length of insulation from the end of the conductor. The tool comprises a pair of overlying, essentially planar arm members which are pivotally connected to be movable in scissors fashion. An elongated portion of the arm members on one side of the pivot point serve as handles for operating the tool. A pair of upturned wire severing members are mounted on the other side of and adjacent to the pivot point. These transversely operating severing members have opposed, sharpened cutting edges which are oriented substantially normal to the longitudinal axis of the tool and are also normal to the plane or planes containing the arms. A pair of upturned insulation stripping members are located on the arms beyond to the severing members. Thse insulation stripping members are oriented essentially parallel to the cutting portion of the severing members. They have cooperating opposed V-shaped notches for cutting through the wire insulation without cutting into the conductor. The space between the cutting portions of the severing members and the stripping member defines a fixed distance from which insulation will be stripped from a length of wire. The handle portion of the arms contains an adjustable stop which is mounted on one arm in a position to operate against an anvil on the other arm. This arrangement enables the user to easily control the depth of cut into the insulation in order to accommodate and strip various wire sizes. A major advantage of the upturned severing and stripping members is that the tool can readily cut into a wire of any length, even a taut wire, without interference from the handles.

The basic tool just described may further include longitudinally oriented cutting jaws which are located in the plane of the arm members between the severing members and the stripping members.

In order to achieve easy one-handed operation, the tool may also have a spring or other biasing means which is located between the handle portion of the arms so that the jaws are in a normally open position.

A preferred form of adjustable stop is a polygonal cam which is mounted on one of the handles. This cam can be retained in position by friction or by a detent mechanism. Conventional gauged wire strippers may be included in the handles.

The tool just described will normally have at least one offset portion in each arm member in the pivot area so that the arm members anterior to the pivot will lie within a common plane. Preferably, each arm will have a double offset portion in the pivot area so that the arm members on both sides of the pivot point lie within the same plane. With this latter arrangement, it is considered within the scope of the invention to add a series of opposed insulation stripping notches of graduated sizes in the arm members on the handle side of the pivot point.

In operation, it is only necessary to place a length of wire in the tool, close the handles as far as is permitted by the stop, and give a slight twist and axial pull. This will trim the end of the wire and readily remove the predetermined length of insulation to present a conductor ready for connection to or insertion in an appliance.

It is an object of the present invention to provide an improved electrician's plier which will simultaneously cut and strip a predetermined length of insulation from the end of a conductor.

It is a further object to provide an electrican's plier which will simultaneously cut and strip insulation from a variety of wire sizes while leaving a predetermined length of bare conductor.

These and many other objects will be readily apparent to those skilled in the art upon reading the following detailed description taken in conjunction with the drawing.

BRIEF DESCRIPTION OF THE DRAWINGS

FIG. 1 is a top plan view of the pliers.

FIG. 2 is a top plan view of the upper arm member of FIG. 1.

FIG. 3 is a similar top plan view of the lower arm member of FIG. 1.

FIG. 4 is a side elevation of the arm member shown in FIG. 2 in an inverted position.

FIG. 5 is a similar side elevation of the arm of FIG. 3 in an inverted position.

FIG. 6 is a side elevation of the assembled plier as it would be used in cutting into a run of wire.

DETAILED DESCRIPTION OF THE PREFERRED EMBODIMENTS

Construction of plier can be readily visualized by reference to FIG. 1. The pliers generally shown at 2 and consists of a first arm member 4 and a second arm 6 which serves as handles. The ends of these arm members may be covered with plastic coating 8,10 so that they are more comfortable to use. The arms are joined together by a pivot 12 which may be a bolt, rivet or other conventional fastener. Lower arm member 10 has an anterior portion 14 which lies opposite and coplanar with a similar portion 16 of upper arm member 8. Each arm member has an upturned portion which serves as a cutting edge, shown here as elements 18,20. This cutter portion is normally located as close as possible to the pivot point in order to achieve maximum leverage. A pair of wire stripping cutters 22,24 are located anteriorly to the wire cutters 18,20. The cutting members located so that they are normal to the longitudinal access of the tool and normal to the plane defined by arm portions 14,16. The wire strippers 22,24 are oriented parallel to the cutter members so that they are also normal to the longitudinal access to the tool, and normal to the plane of the anterior portion of the arm members. The wire strippers 22, 24 are located on the same side of the plane defined by arm portions 14, 16 as are the wire cutters 18, 20.

As an optional feature, the tool may include a conventional longitudinally oriented wire cutter defined by cutting edges 26,28. Thse cutting edges are conveniently located between the wire cutters and the strippers. In similar fashion, a series of auxiliarly insulation stripping notches may be located on the other side of pivot 12, on the handle of the tool. These auxiliary strippers 30,32 only one set of which is numbered, will normally be graduated to accommodate a number of wire sizes.

The depth of cut of stripper members 22,24 is controlled by a polygonal cam 34, which rotates about a bolt or similar retainer 36. The cam operates against an upturned anvil 38 on the opposite handle.

The plier may optionally have a spring 38 or other biasing means designed to maintain the jaws in a normally open position. This is a distinct convenience for the electrician using the tool. The spring is retained on lugs 40,42 (FIGS. 2 and 3).

In its preferred form, the tool will be stamped from heavy sheet steel, which can be appropriately hardened and finished.

It is not essential that handle portions 4 and 6 lie in the same plane, though this is a distinct convenience. This goal can be readily accomplished by making a double offset portion on each side of the pivot aperatures 13,13', as best seen in FIGS. 4 and 5.

The anterior stripping members 22,24 will have respective V-shaped notches 25,27 which are ground to a cutting edge. These notches are designed to cut only through the insulation without cutting into the conductor.

Cam 34 is normally bolted to handle 6 into aperature 37. The cam may be held sufficiently tight by friction alone to maintain its position. Alternatively, a dependent arrangement can be provided.

Operation of the tool, and one of its major advantages, is seen by reference to FIG. 6. Here the pliers 2 is cutting into an electrical wire 48 having a conductor 49 covered with insulation 50. The wire will be severed as cutters 18,20 and the small portion 52 discard the portion of insulation 54 between insulation strippers 22,24 can be readily removed simply by giving the tool a slight twist and an axial pull. In this manner, a consistent length of wire is stripped at each operation. Normally the stripped portion will be approximately ¾" in length.

A major advantage of the present tool which accrues because of the structure of the cutters is its convenience of use when cutting into a long run of wire. In prior art tools of this type, shown for example, in U.S. Pat. No. 3,854,202, the handles get in the way of the operation and become a distinct nuisance. As seen in FIG. 6, the run of wire with the tool of the present invention lays along the surface of the handles so that no conflicting relationship exists.

It will be readily evident to those skilled in the art that many variations can be made in the construction of the present tool without the departing from the spirit of the invention. It is the intention of the inventor that the scope be limited only by the following claims.

What is claimed is:

1. A tool for simultaneously cutting an electrical wire and stripping a predetermined length of insulation which comprises:

a pair of overlying, essentially planar arm members pivotally connected to be movable in scissors fashion, an elongated portion of said members on one side of the pivot point serving as handles for operating the tool;

a pair of upturned wire severing members mounted on the arms on the other side of and adjacent the pivot point, said severing members having opposed sharpened cutting portions oriented substantially normal to the longitudinal axis of the tool and normal to the plane of the arms;

a pair of upturned insulation stripping members located on the arms anterior to the severing members, said insulation stripping members oriented essentially parallel to the cutting portions of the severing members and having cooperating opposed notches for cutting through the wire insulation without cutting into the electrical conductor, said stripping members being located on the same side of said plane of the arms as said severing members whereby the space between the cutting portions of the severing members and the stripping members defines a fixed distance from which insulation will be stripped from a wire; and an adjustable stop means mounted on one arm member in a location to cooperate with a fixed anvil mounted on the other arm member for controlling the depth of cut into the insulation in order to accommodate and strip various wire sizes, said upturned severing members and stripping members enabling the tool to function on a wire of any length without interference from the handles.

2. The tool of claim 1 which further includes longitudinal cutting jaws located in the plane of the arm members between the severing members and the stripping members.

3. The tool of claim 1 which further includes spring biasing means located between the handle portion of the arms so as to hold the jaws in a normally open position.

4. The tool of claim 1 in which the adjustable stop means is a polygonal cam mounted on the handle portion of the arms.

5. The tool of claim 1 in which each arm member has a double offset in the pivot area so that the arm members lie in a common plane on each side of the pivot point.

6. The tool of claim 5 which further includes a series of graduated opposed stripping notches in the arm members on the handle side of the pivot point.

* * * * *